United States Patent
Golestani et al.

(10) Patent No.: US 7,194,271 B2
(45) Date of Patent: Mar. 20, 2007

(54) ALLOCATION OF CHANNELS TO WIRELESS LANS

(75) Inventors: S. Jamaloddin Golestani, New Providence, NJ (US); Rajeev Rastogi, Chatham, NJ (US); Mark Anthony Smith, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 221 days.

(21) Appl. No.: 10/821,893

(22) Filed: Apr. 12, 2004

(65) Prior Publication Data

US 2005/0226191 A1 Oct. 13, 2005

(51) Int. Cl.
H04Q 7/20 (2006.01)

(52) U.S. Cl. .............................. 455/452.1; 455/63.11; 370/338

(58) Field of Classification Search ............. 455/552.1, 455/550.1, 422.1, 423, 426.1, 426.2, 446, 455/449, 450, 425, 451, 452.1, 452.2, 63.1, 455/67.11, 501, 67.13, 553.1; 370/321, 337, 370/341, 347, 310, 208, 465, 328, 338, 468, 370/479
See application file for complete search history.

(56) References Cited

U.S. PATENT DOCUMENTS

| | | | | |
|---|---|---|---|---|
| 5,574,979 | A * | 11/1996 | West | 455/63.1 |
| 5,613,198 | A * | 3/1997 | Ahmadi et al. | 370/337 |
| 6,031,863 | A * | 2/2000 | Jusa et al. | 375/132 |
| 6,487,392 | B1 * | 11/2002 | Sonetaka | 455/11.1 |
| 6,636,737 | B1 * | 10/2003 | Hills et al. | 455/450 |
| 6,892,054 | B2 * | 5/2005 | Belcher et al. | 455/63.1 |
| 7,027,424 | B1 * | 4/2006 | Horvat et al. | 370/337 |
| 7,050,452 | B2 * | 5/2006 | Sugar et al. | 370/465 |
| 2002/0176396 | A1 * | 11/2002 | Hammel et al. | 370/347 |
| 2003/0123405 | A1 * | 7/2003 | del Prado et al. | 370/331 |
| 2004/0192284 | A1 * | 9/2004 | Vaisanen et al. | 455/422.1 |
| 2005/0020299 | A1 * | 1/2005 | Malone et al. | 455/552.1 |
| 2005/0190731 | A1 * | 9/2005 | Bejerano et al. | 370/338 |

FOREIGN PATENT DOCUMENTS

| EP | 0 622 925 A1 | 4/1994 |
|---|---|---|
| WO | WO 97/38509 | 10/1997 |

* cited by examiner

Primary Examiner—Charles N. Appiah

(57) ABSTRACT

Channels are allocated to one or more cells within a wireless LAN (WLAN) without causing unacceptable interference. The allocation involves dividing an allocation time period into frames, each frame having a substantially short duration, and then allocating one or more channels to one or more WLAN cells during each such frame according to an allocation vector. The vector assures that each cell allocated a channel is sufficiently distant from every other cell allocated the same channel to minimize cross interference. Only those cells allocated a channel are allowed to transmit during a given frame. The allocation vectors are determined in such a way that the performance of a WLAN is optimized.

28 Claims, 2 Drawing Sheets

ALLOCATION OF CHANNELS TO WIRELESS LANS

BACKGROUND OF THE INVENTION

The number of channels available to wireless, local area networks (WLANs) is relatively small. In some instances the number of non-overlapping channels (i.e., separate channels) may be much less than ten. For example, among the seven channels specified by the so-called 802.11b standard and allotted by the Federal Communications Commission (FCC) to WLAN usage, only three are non-overlapping. Because the number of non-overlapping channels is so small, it is very difficult to allocate channels to competing WLANs or to various access points (APs) (e.g., a connecting point between a WLAN cell and a wired infrastructure) within one WLAN.

Complicating matters further, those channels that have been set aside by the FCC, such as the seven channels mentioned above, are currently unregulated. That is, though the FCC has allotted certain channels for WLAN usage, it does not decide who can use these channels, or when they can be used. As a result, nothing prevents a source outside the control of a network administrator (e.g., outside the control of the administrative function or entity of a given WLAN) from interfering with users operating over such channels. Still further complicating matters is the fact that this interference is unpredictable. That is, a given channel may be free of outside interference at one given time, yet may become unavailable due to a high level of interference at another time. Similarly, for a given channel one segment of a network may be free from interference while another segment is virtually unusable at the same time. The unpredictable nature of the interference makes it difficult to efficiently allocate a given channel to a network at any given period of time.

Another challenge related to the allocation of channels to WLANs is the fact that WLANs cannot make use of existing, so-called hexagonal layouts used by cellular networks. This is because a signal propagated by a WLAN usually travels entirely indoors compared to a cellular network, where signals travel mostly outdoors. Said another way, because a WLAN generated signal travels mostly indoors, the shape of the cells (i.e., coverage areas associated with each AP) is greatly affected by the internal structure of the building, etc. within which the WLAN is located.

Because of the high level of interference involved in WLANs, and the unavailability of hexagonal designs, a new framework for allocating channels to WLANs is needed.

SUMMARY OF THE INVENTION

We have recognized that channels may be allocated to one or more cells within a wireless LAN (WLAN) without causing unacceptable interference by: first, dividing an allocation time period into frames, each frame having a substantially short duration; generating, during each frame, a set of active WLAN cells from the one or more cells based on an allocation vector; and then allocating, during each frame and to each active WLAN cell, one or more channels from among a group of available channels.

In accordance with the present invention, only those cells allocated a channel may transmit during a given frame. All other cells are prevented from transmitting during the corresponding frame.

To satisfy the minimum cross-interference requirement, the present invention provides for allocating a channel to the one or more WLANs that satisfy a maximum allowed cross interference given by:

$$a_l^n \left( I_{o,l}^n + \sum_{k=1}^{L} a_k^n \cdot I_{k,l} \right) \le I_l^{max}, n = 1, 2, \ldots, N, l = 1, 2, \ldots, L,$$

where L denotes a number of cells, N denotes a number of available channels, $I_{o,l}^n$ denotes an amount of external interference within a channel n to a cell l, $a_l^n$ denotes entries of the channel allocation vector, defined as $$a_l^n \underset{=}{def} \begin{cases} 1 & \text{channel } n \text{ is allocated to } l \text{ during} \\ & \text{the frame under consideration,} \\ 0 & \text{otherwise.} \end{cases}$$

denotes the cross interference from cell k to cell l when both cells k and l operate over the same channel, and $I_l^{max}$ denotes the maximum allowable cross interference.

DETAILED DESCRIPTION OF THE INVENTION

Figure 1:
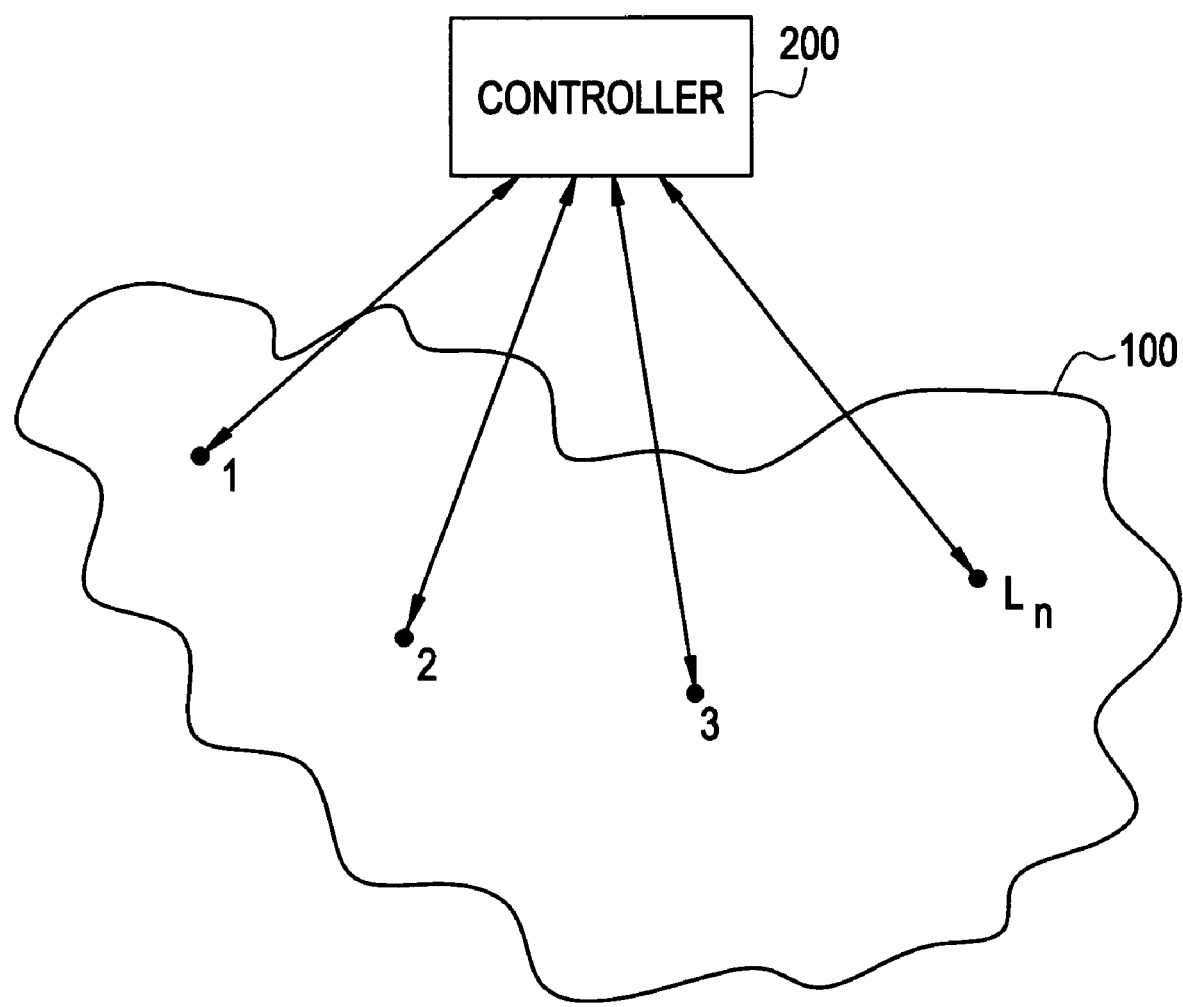
FIG. 1 depicts a simplified diagram of a WLAN comprising a number of cells which utilizes methods of allocating channels to cells without causing unacceptable interference according to embodiments of the present invention.

The present invention provides for the allocation of channels, in particular radio-frequency (RF) channels, to WLANs. It differs from traditional allocation techniques used in cellular networks in at least three ways.

First, the channel allocation techniques provided by the present invention are not guided by hexagonal layouts, even as theoretical starting points.

Second, techniques provided by the present invention allocate channels to a WLAN cell dynamically, instead of statically. That is, instead of allocating channels to a WLAN cell for a, relatively speaking, long period of time as is done in cellular networks, channels are allocated to a WLAN cell for a substantially short period of time. Such a time period is herein referred to as a "frame". A frame's duration could be as small as a millisecond or a fraction thereof. This length of time is much shorter than the length of time channels are allocated to cells in a cellular network which, at the minimum, might be about the length of time taken up by a cellular telephone call.

Third, because the present invention provides for the dynamic allocation of channels, it is applicable to situations where the set of channels available for allocation varies with time (depending, for example, on the interference levels from sources outside the control of a WLAN).

To simplify the explanation of the present invention, the following discussion will assume that a WLAN includes a given number of APs at pre-specified locations. Therefore, in one embodiment of the invention there is no need to determine an appropriate number of APs or locations for a given WLAN.

To further simplify the explanation which follows, power control problems are not addressed. Instead, in an additional embodiment of the invention, the power levels associated with each AP and its users are assumed to be pre-determined and fixed.

Because the location of APs and their power levels are assumed to be pre-determined and fixed, it follows that the level of interference attributable to a transmitting AP and its associated users is known in advance.

Further simplifications may also be made. For example, by assuming that the actual level of external interference received by each WLAN cell and for every channel is known and by assuming that the allocation of channels to a WLAN cannot include altering any user-AP associations (i.e., channels are allocated to WLANs without changing, controlling or otherwise influencing the assignment of users to a particular AP), the explanation which follows is simplified.

In an ideal network management scenario, because the interference level imposed on a WLAN cell by an external source is potentially time-dependent, this interference information could be determined by ongoing real-time measurements. Such measurements may also be used to more accurately determine the cross interference among WLAN cells as well.

Having stated some embodiments based on simplifying assumptions, it should be understood that the scope of the present invention is not limited to embodiments which incorporate these assumptions. Rather, additional embodiments, realized without taking one or more of these assumptions into consideration, may also be within the scope of the present invention.

Referring now to FIG. 1, there is shown a WLAN 100 consisting of L cells, represented by corresponding access points l=1,2, . . . , L, where, there are N channels available for allocation by a controller 200 or the like to each cell l, denoted as n=1,2, . . . , N. The challenge becomes deciding the best way to allocate these channels N to cells L based on some performance criterion.

In one embodiment of the present invention, an allocation time period is divided up into frames, each frame having a substantially short duration. Next, for each frame, a set of active WLAN cells is generated based on an allocation vector, the details of which will be discussed further below. Thereafter, during each frame, a set of channels from among a group of available channels may be allocated to each active WLAN cell. Optionally, the duration of each frame may be substantially the same or different. The active cells which are allocated a channel are allowed to transmit during a corresponding frame while cells that are not allocated a channel during a given frame (i.e., inactive cells) are turned off for the whole duration of a given frame. That is, an AP of such a cell and/or its associated users are prevented from transmitting during a corresponding frame. It should be further understood that the sets of channels available for allocation may vary with time.

In another embodiment of the invention, during each frame one channel from the set of available channels may be allocated to a cell. However, it should be understood that a given channel may be assigned (i.e., re-assigned) to more than one WLAN cell to overcome channel shortages.

Such shortages are due to the fact that the number of channels N is usually much less than the number of cells L. To overcome shortages, the present invention provides for the use of a channel reuse technique (e.g., one channel is allocated to several cells simultaneously). In yet a further embodiment of the present invention, the same channel may be allocated to a number of active cells provided each of the cells allocated the same channel are substantially distant from one another to minimize the amount of cross interference between them (i.e., to ensure the cross interference is tolerable).

A formal expression of the requirement that cells be substantially distant from one another to minimize interference when the same channel is allocated to one or more cells involves a discussion of an number of parameters, beginning with $I_l^{max}$, which is a maximum allowable interference to cell l from all sources. Next, a cross interference, denoted $I_{k,l}$, is defined as the cross interference from cell k to cell l when both cells k and l operate over the same channel. Before going further, it should be understood that by "cross interference from cell k", is meant the interference caused by an AP or a transmitting user within cell k. Similarly, "cross interference to cell l" refers to the interference affecting an AP or a receiving user within that cell.

In accordance with the present invention, the value of $I_{k,l}$, is determined by accounting for the variability of user locations within cells k and l. That said, the details of this subject are beyond the scope of the invention and are not needed to understand the features of the present invention. It should be further noted that because the transmission power of cells k and l may be different, in general $I_{k,l}$ and $I_{l,k}$ are not equal.

In addition to interference effects, channel allocation considerations need to be introduced. As explained before, an allocation time period is divided into frames. In one embodiment of the present invention, the period of time of each frame lasts for substantially the same duration denoted by θ and channels may be allocated to each cell at the beginning of each frame. If these time frames are denoted f=1,2,3, . . . , in one embodiment of the present invention, channel allocation decisions can be expressed by a non-binary L dimensional vector $A^f$, comprising integer entries $a_l^f$ defined as:

$$a_l^f \stackrel{def}{=} \begin{cases} n & \text{channel } n \text{ is allocated to } l \text{ during the frame } f, \\ 0 & \text{otherwise.} \end{cases} \quad (1)$$

Alternatively, channel location decisions related to a given channel, n, may be expressed using a binary, L dimensional vector, $A^{n,f}$ comprising entries:

$$a_l^{n,f} \stackrel{def}{=} \begin{cases} 1 & \text{channel } n \text{ is allocated to } l \text{ during the frame } f, \\ 0 & \text{otherwise.} \end{cases} \quad (2)$$

$A^f$ is referred to as the "allocation vector" and $A^{n,f}$ is referred to as the "channel allocation vector" (for channel n). It should be noted that a unique correspondence exists between the allocation vector $A^f$, on the one hand, and the set of channel allocation vectors $\{A^{n,f}, n=1,2, \ldots, N\}$, on the other hand.

One last, but not least, vector needs to be discussed. An activation vector, $\hat{A}^f$, is also defined as a vector which specifies those cells that are active, i.e., those that have been allocated a channel, during f. $\hat{A}^f$ comprises entries defined as:

$$\hat{a}_l^f \stackrel{def}{=} \begin{cases} 1 & \text{some channel is allocated to cell } l \text{ during frame } f, \\ 0 & \text{otherwise.} \end{cases} \quad (3)$$

The activation vector is used to generate the active WLAN cells which be permitted to transmit (and by default, the inactive cells that will be prevented from transmitting) during a given frame.

One more factor must be discussed before arriving at a maximum cross-interference requirement between cells, namely, the amount of interference to a channel n from external sources that affect a cell l denoted $I_{o,l}^{n,f}$. The superscript f is included to emphasize the time varying nature of external interference. The dynamics of such a variation, however, can be rather slow. In any event, the present invention assumes that prior to each frame, f, an estimation of the external interferences during that frame, $I_{o,l}^{n,f}$, l=1,2 . . . L, n=1,2, . . . , N, is available.

To simplify the notation which follows, so long as it is understood that the discussion which follows relates to a single frame A, the vectors, entries and interferences described above can be expressed as A, $a_k$, $A^n$, $a_k^n$ and $I_{o,l}^n$, respectively.

Using the notation just given, the requirement placed on the maximum cross interference between cells used in allocating channels during each frame f, can be expressed as:

$$a_l^n \left( I_{o,l}^n + \sum_{k=1}^{L} a_k^n \cdot I_{k,l} \right) \leq I_l^{\max}, n = 1, 2, \ldots, N, l = 1, 2, \ldots, L, \quad (4)$$

where, for the sake of simplicity, $I_{l,l} \stackrel{def}{=} 0$, l=1,2, . . . , L. The term $a_l^n$ appears on the left hand side of Equation (4) in order to ensure that, whenever n is not allocated to l, Equation (4) is automatically satisfied.

In one embodiment of the present invention, during each frame one or more channels are allocated to cells based on allocation vectors that satisfy Equation (4).

Besides being interested in allocation vectors that satisfy Equation (4), it is also desirable to make sure that an allocation vector is maximal, i.e., no additional cells can be activated without violating Equation (4). To ensure that this is so, the present invention places the following additional restrictions on a potential allocation vector.

If A and B are two allocation vectors, it can be said that A dominates B if for all channels n=1,2, . . . , N, $A^n \geq B^n$, with strict inequality for at least one value of n.

In addition, for an allocation vector A to be maximally feasible, or feasible for short, it must satisfy Equation (4) and no allocation vector that dominates it can satisfy Equation (4). The set of maximally feasible allocation vectors is denoted by F, and is called the feasible set.

Accordingly, in yet another embodiment of the present invention, an allocation vector is selected, for each time frame f, from among the set of maximally feasible allocation vectors F.

We now turn to a discussion of rules and criteria that the present invention may utilize to determine the best allocation vector among all vectors. For example, the present invention may place the following general criteria on the selection of an activation vector.

Given some positive weight, denoted $w_l$, associated with each cell l, channels are allocated according to the following allocation vector:

$$A^* = \arg \max_{\forall A \in F} \sum_{l=1}^{L} \hat{a}_l \cdot w_l. \quad (5)$$

Equation (5) may be referred to as a Maximum Weight Channel Allocation rule. In one embodiment of the present invention, Equation (5) is used to identify a best allocation vector from among possible allocation vectors.

Although the superscript f is not shown in Equation (5), the weights $w_l$ may vary with time. Accordingly, allocations according to vector A* may change with time as well.

For example, the weights, $w_l$, may change from frame to frame. Correspondingly, an allocation vector may also be selected on a per frame basis as well.

Depending on the cell weights $w_l$ that are used in Equation (5), different allocation policies with potentially different properties will result.

For example, in yet a further embodiment of the invention, the weights in Equation (5) may be chosen as $w_l = q_l$, where $q_l$ is the length of the virtual queue of l at the beginning of each corresponding frame f and the virtual queue of cell l is the aggregation of queues of an access point associated with l and users associated with cell l. The resulting policy may be referred to as a Maximum Queue Length Channel Allocation, denoted P.

Figure 2:
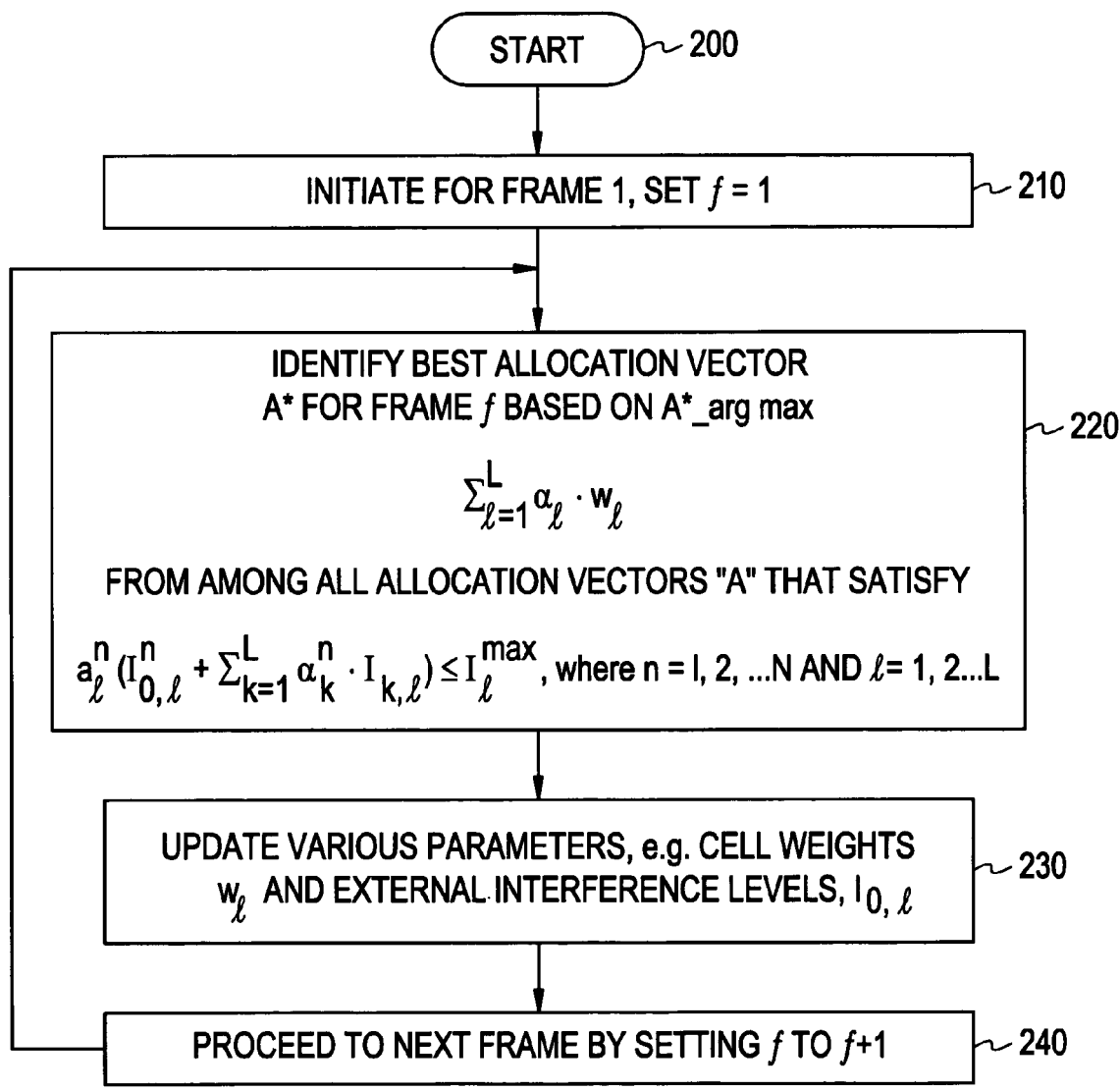
FIG. 2 depicts a summary flow diagram of methods for allocating channels to cells without causing unacceptable interference according to embodiments of the present invention.

A summary of some of the steps involved in allocating channels to cells without causing unacceptable interference according to embodiments of the present invention described above along with general initiating and reiterative steps are shown in the flow diagram in FIG. 2.

One consequence of using the Maximum Queue Length Channel Allocation policy, P, based on Equation (5) where the weights, $w_l$, are chosen as the length of virtual queues, $q_l$, is that the throughput of the WLAN is maximized in the sense that, for a given pattern of traffic arrivals to the system, all of the cell virtual queues will be stable under policy P, if they are stable under any other channel allocation policy.

The discussion above has set forth some examples of methods for allocating channels to WLANs without causing unacceptable interference. It should be understood that the controller 200 or a similar device may be operable to carry out each of the features and functions of the methods described above and below using software, firmware, hardware or some combination of the three. Other examples of the inventive methods and controller may also be envisioned. For example, in yet another embodiment of the present invention the period of time associated with each frame may be of a substantially different duration. It is next to impossible, however, to set forth every conceivable example. Accordingly, additional examples, modifications, etc., that may be thought of by those skilled in the art may remain within the spirit and scope of the parent invention defined by the claims which follow.

We claim:

1. A method for allocating channels from among a group of available channels, to one or more cells within a wireless LAN (WLAN), without causing unacceptable interference comprising:
    dividing a time period into frames, each frame having a substantially short duration;
    generating, for each frame, a set of active WLAN cells from the one or more cells based on an activation vector;
    allocating, for each frame and to each one of the one or more active WLAN cells, one or more channels from among the group of available channels based on an allocation vector that satisfies a maximum allowed cross interference;
    permitting the active WLAN cells, during a given frame, to transmit; and
    preventing WLAN cells, that are not allocated a channel during a given frame, from transmitting during the given frame.

2. The method as in claim 1 further comprising allocating, during each frame, a channel from the set of available channels to more than one active cell substantially simultaneously.

3. The method as in claim 1 wherein each cell which is allocated a same channel as any other cell during the given frame is sufficiently distant from each other cell allocated the same channel to minimize cross interference.

4. The method as in claim 3 further comprising allocating during each frame and to each active cell, one channel from the set of available channels.

5. The method as in claim 1 wherein the set of channels available for allocation may vary with time.

6. The method as in claim 1 wherein the duration of each frame is substantially the same.

7. The method as in claim 1 wherein the duration of each frame is substantially different.

8. The method as in claim 1 wherein the set of available channels comprises radio frequency channels.

9. The method as in claim 1 further comprising allocating the one or more channels to the one or more active WLAN cells at the beginning of the frame.

10. The method as in claim 4 further comprising allocating, during each frame, one or more channels to the one or more active WLANs that satisfy a maximum allowed cross interference given by:

$$a_l^n \left( I_{o,l}^n + \sum_{k=1}^{L} a_k^n \cdot I_{k,l} \right) \le I_l^{\max}, n = 1, 2, \ldots, N, l = 1, 2, \ldots, L,$$

where L denotes a number of cells, N denotes a number of available channels, $I_{o,l}^n$ denotes an amount of external interference within a channel n to a cell l, $a_l^n$ denotes entries of the channel allocation vector, defined as $$a_l^n \stackrel{def}{=}$$

$$\begin{cases} 1 & \text{channel } n \text{ is allocated to } l \text{ during the frame under consideration,} \\ 0 & \text{otherwise.} \end{cases}$$

$I_{k,l}$ denotes the cross interference from cell k to cell l when both cells k and l operate over the same channel, and $I_l^{max}$ denotes the maximum allowance cross interference.

11. The method as in claim 1 further comprising selecting the allocation vector from among a set of maximally feasible allocation vectors.

12. The method as in claim 11 further comprising selecting an allocation vector defined by:

$$A^* = \arg \max_{\forall A \in F} \sum_{l=1}^{L} \hat{a}_l \cdot w_l$$

where $W_l$ are positive weights associated with each cell, l, and F is the set of feasible allocation vectors.

13. The method as in claim 12 wherein the weights, $W_l$, may change from frame to frame and the selection of an allocation vector is repeated on a per frame basis.

14. The method as in claim 13 wherein a Maximum Queue Length Channel Allocation is defined by choosing weights $W_l = q_l$, where $q_l$ is the length of a virtual queue of l at the beginning of each corresponding frame.

15. A controller, for allocating channels from among a group of available channels to one or more cells within a wireless LAN (WLAN) without causing unacceptable interference, operable to:
    divide a time period into frames, each frame having a substantially short duration;
    generate, for each frame, a set of active WLAN cells from the one or more cells based on an activation vector;
    allocate, for each frame, and to each one of the one or more active WLAN cells, one or more channels from among the group of available channels based on an allocation vector that satisfies a maximum allowed cross interference;
    permit the active WLAN cells, during a given frame, to transmit; and
    prevent WLAN cells, that are not allocated a channel during a given frame, from transmitting during the given frame.

16. The controller as in claim 15 further operable to allocate, during each frame, a channel from the set of available channels to more than one active cell substantially simultaneously.

17. The controller as in claim 15 wherein each cell which is allocated a same channel as any other cell during the given frame is sufficiently distant from each other cell allocated the same channel to minimize cross interference.

18. The controller as in claim 17 further operable to allocate, during each frame and to each active cell, one channel from the set of available channels.

19. The controller as in claim 18 further operable to allocate, during each frame, one or more channels to the one or more WLANs that satisfy a maximum allowed cross interference given by:

$$a_l^n \left( I_{o,l}^n + \sum_{k=1}^{L} a_k^n \cdot I_{k,l} \right) \le I_l^{\max}, n = 1, 2, \ldots, N, l = 1, 2, \ldots, L,$$

where L denotes a number of cells, N denotes a number of available channels, $I_{o,l}^n$ denotes an amount of external interference within a channel n to a cell l, $a_l^n$ denotes entries of the channel allocation vector, defined as $a_l^n \stackrel{def}{=}$ $$\begin{cases} 1 & \text{channel } n \text{ is allocated to } l \text{ during the frame under consideration,} \\ 0 & \text{otherwise.} \end{cases}$$

$I_{k,l}$ denotes the cross interference from cell k to cell l when both cells k and l operate over the same channel, and $I_l^{max}$ denotes the maximum allowable cross interference.

20. The controller as in claim 19 further operable to select the allocation vector from among a set of maximally feasible allocation vectors.

21. The controller as in claim 15 wherein the set of channels available for allocation may vary with time.

22. The controller as in claim 15 wherein the duration of each frame is substantially the same.

23. The controller as in claim 15 wherein the duration of each frame is substantially different.

24. The controller as in claim 15 wherein the one or more channels comprise radio frequency channels.

25. The controller as in claim 15 further operable to allocate the one or more channels to the one or more WLAN cells at the beginning of the frame.

26. The controller as in claim 20 further operable to select an allocation vector defined by:

$$A^* = \arg \max_{\forall A \in F} \sum_{l=1}^{L} \hat{a}_l \cdot w_l$$

where $W_l$ are positive weights associated with each cell, l, and F is the set of feasible allocation vectors.

27. The controller as in claim 26 wherein the weights, $W_l$, may change from frame to frame and the selection of an allocation vector is repeated on a per frame basis.

28. The controller as in claim 27 wherein a Maximum Queue Length Channel Allocation is defined by choosing weights $W_l=q_l$, where $q_l$ is the length of a virtual queue of l at the beginning of each corresponding frame.

* * * * *